United States Patent Office 2,715,931
Patented Aug. 23, 1955

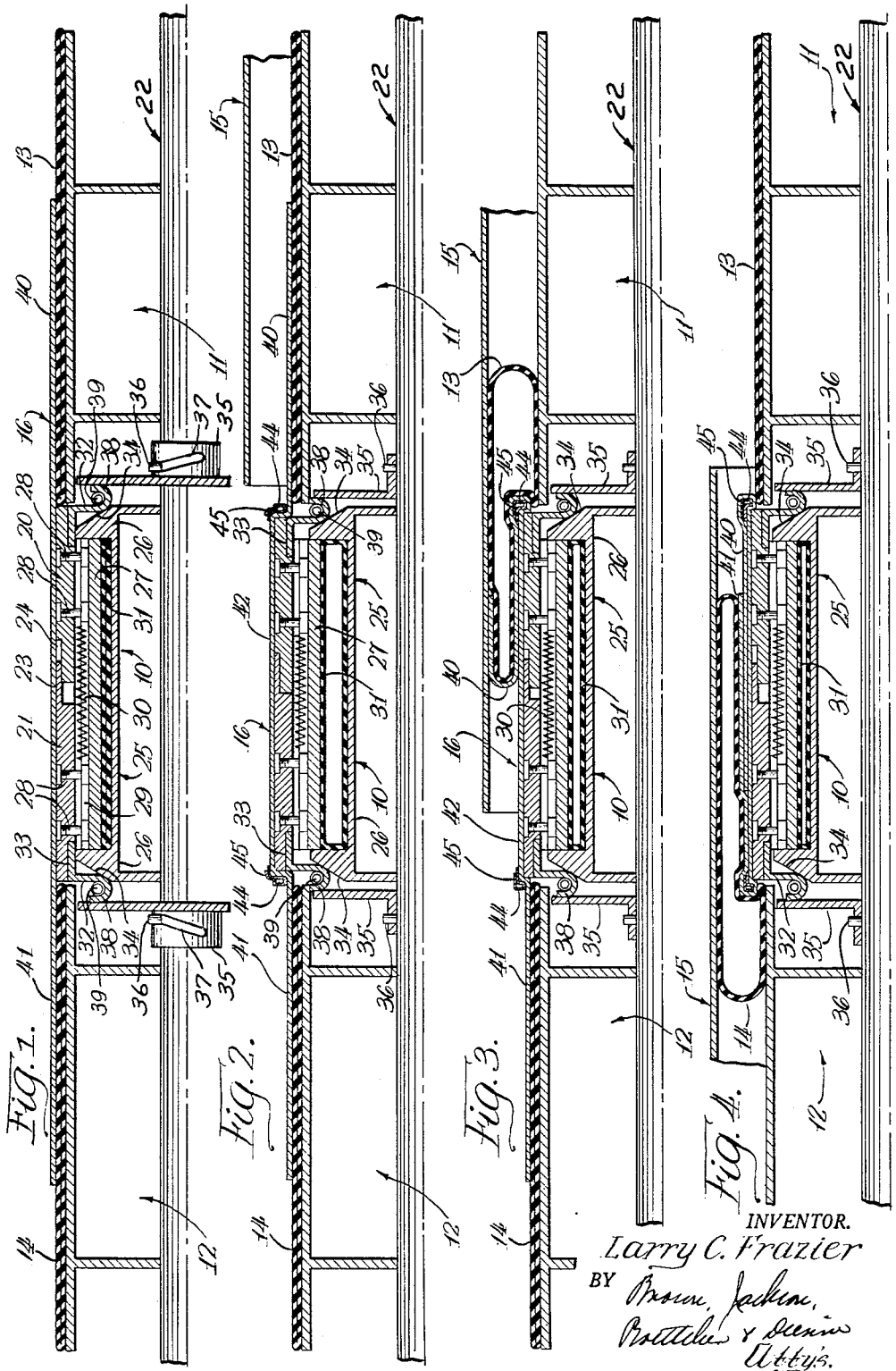

2,715,931

DRUM ASSEMBLY FOR TIRE BUILDING MACHINE

Larry C. Frazier, Niles, Mich., assignor, by mesne assignments, to The Goodyear Tire & Rubber Company, a corporation of Ohio Continuation of application Serial No. 180,452, August 19, 1950. This application October 10, 1952, Serial No. 314,092

20 Claims. (Cl. 154—9)

My present invention is directed to a new and improved expansible drum assembly for constructing pneumatic tire carcasses or the like on a tire building machine such as I have disclosed and described in my Patent No. 2,565,071, dated August 21, 1951. Moreover, my present application constitutes a continuation of my pending application, Serial No. 180,452, filed August 19, 1950, now abandoned.

More precisely my present invention constitutes an improvement over the drum assembly disclosed in my above named patent and is so designed as to control the relative helical position of the tire fabric cords of several or alternate plies of tire fabric which make up the tire carcass so that the cords will ultimately lie in parallel angular position in the finished tire carcass.

Briefly, my improved drum assembly constitutes a central expansible forming drum flanked at either end by an auxiliary drum having an expansible folding tube or inflatable folding bag mounted thereabout. The center drum is designed to expand radially outward under an internal expanding force to set up an initial drum diameter which causes a radial tensioning of the plies of tire fabric wrapped thereabout. Additionally, the center drum is designed to telescope or move longitudinally to keep the tire fabric taut during the folding thereof into a tire carcass. A hollow cage or folding drum is also provided to carry expansible folding tubes or bags alternately over the center drum to fold the tire fabric plies over one another. When the cage carries a folding bag over the expanded center drum, the external force applied by such folding bags overcomes the internal expanding force which is holding the center drum at its outer set diameter. The center drum diameter then decreases until a predetermined smaller diameter stop setting is reached. Simultaneously the center drum telescopes lengthwise to take up the fabric slack resulting from the decrease of the center drum diameter. The smaller collapsed diameter is determined in relation to the thickness of the several plies of tire fabric which are consecutively laid over the center drum to form the tire carcass. After the external inwardly directed force of a folding tube or bag is released, the internal expanding force of the center drum causes the center drum to return to its normal set outer position; the length of the center drum contracting in accordance with the expansion movement to keep the tire fabric at a constant tension. The above described action permits the formation of a tire carcass in which the cords of the several folded tire fabric plies are disposed at substantially identical helical angles and lie in substantially parallel relation with one another since the folded portions thereof are folded at substantially the same folding diameter.

It is the main object of my invention to provide a new and improved tire carcass forming apparatus which will enable the production of a multi-ply tire carcass in which the cords of the several folded plies thereof lie in substantially parallel and equi-angular relation.

Another object of my invention is to provide a forming drum which is adapted to expand to a set outer diameter and retract through a succeeding series of smaller diameters whereby the several plies of tire fabric of a tire carcass may be folded one over the other all at substantially the same folding diameter.

A further object of my invention is to provide a center forming drum that is adapted not only to expand and contract radially but additionally is capable of lengthwise telescopic movement in response to such radial movement whereby the sections of tire fabric wrapped about the forming drum are always tensioned tightly thereabout.

Another important object of my invention is to provide a new and improved control means for regulating the lay of the tire fabric cords of the several plies of a multiple ply tire carcass whereby the cords of the folded plies in the completed carcass will lie substantially parallel and at equal helical disposition with one another so that a more sturdy tire carcass construction will result.

These and further objects and features of my invention will become apparent as the following detailed description evolves. In order to acquaint those familiar with the art as to the mode of constructing and utilizing my invention, reference is made to my referred to Patent No. 2,565,071, and to the accompanying drawings.

In the drawings:

Figure 1 is a schematic front elevational view of a tire building drum assembly made in accordance with the teachings of my invention, showing in cross-section the central forming drum thereof in its collapsed stage with parts thereof being illustrated in full elevation;

Figure 2 is another schematic view similar to Figure 1 showing the central forming drum in its outer expanded stage;

Figure 3 is still another schematic view similar to Figures 1 and 2 showing the central forming drum collapsed to an intermediate stop position during the first folding operation; and Figure 4 is a schematic view similar to Figure 3 showing the center forming drum collapsed to a second intermediate stop position during the second folding operation.

Looking at Figure 1, it will be observed that the drum assembly therein illustrated comprises generally a central expansible drum assembly 10, a pair of auxiliary drums 11 and 12 flanking either end of the central drum, inflatable folding tubes or bags 13 and 14 surrounding the two auxiliary drums 11 and 12, respectively, and a cylindrical cage or folding drum 15 lying concentrically about and adapted to move over the three above named central and auxiliary drums.

For a detailed description of the various operating mechanisms and type of machine to which the apparatus that I am about to describe is readily adapted, reference is specifically made to my Patent No. 2,565,071, as set forth above. Briefly in passing, it may be said that the drum assembly is axially mounted in a horizontal position between a stanchion or pedestal at one end and a movable tail stock at the opposite end. One auxiliary drum and the center drum are carried by the stanchion and the second auxiliary drum is carried by a shiftable tail stock whereby the second auxiliary drum may be swung away from the center drum for mounting bead ring assemblies thereon and for the purpose of removing the completed tire carcass from the drum assembly. Preferably the drum assembly is axially rotatable to aid in mounting sheet tire fabric 16 formed thereabout as a closed sleeve or cylindrical tube, such as is shown in Figure 1.

The expansible central forming drum 10 comprises the main feature of my present invention and, as illustrated schematically in the drawings, includes a plurality of interfitting segmental cylindrical sections or shoes 20 and 21 which are adapted to move radially with respect to a central supporting shaft member 22. The shoes may be constructed of wood or light metal and must have sufficient strength to withstand the radial thrust exerted thereon as will appear presently.

It will be noted, as seen in Figure 1, that the shoes 21 are provided with an overhanging lip portion 23 adapted for sliding mating engagement with a recessed shoulder 24 formed in the adjacent upper surface of the shoes 20. Cooperating pairs of shoes 20 and 21 are adapted to be mounted in opposed, end-to-end relation about the central shaft 22 to form the expansible forming drum 10. To accomplish this I have provided a shoe supporting cylinder 25 which has an outwardly projecting annular shoulder 26 formed at each end thereof; cylinder 25 being secured rigidly to the axially disposed central shaft 22 as by welding or the like. Segmental cylindrical plate members 27 are adapted to be mounted between each pair of shoes 20 and 21 and the supporting cylinder 25 so as to lie between the shoulders 26 of the latter; the plate members 27 being keyed at their outer ends to the inner faces of shoulders 26 by suitable keys and keyways, not shown, in a manner suitable for permitting the plates 27 to move in a radial direction relative to shaft 22. The keyways in the shoulders 26 fail to extend to the full outer limits thereof so that the outer radial movement of the plates 27 is eventually limited by having the keyed ends thereof coming into abutting stopping contact with the upper ends of the associated keyways in shoulders 26. Connection between plates 27 and the shoes 20 and 21 is accomplished by means of pins 28, a pair of pins being provided for each shoe. The pins 28 are threadingly connected at their upper ends to the shoes with their lower ends being received for sliding movement in longitudinally extending keyways 29 formed along the outer surfaces of the plate members 27. It will be noted that in final assembly, as seen in Figure 1, the shoes are held in a spaced parallel relation outwardly of the underlying plates 27 by means of the pins 28. It further will be observed that the lower ends of the pins 28 are mushroomed out to mate with the keyways 29 for connecting the shoes to the plates 27 in manner suitable for permitting the pins and thus the attached shoes to slide linearly lengthwise along the guideways 29, the purpose of which will appear presently. The shoes 20 and 21 of each mating pair thereof are normally biased apart by coil spring means 30 positioned between the shoes and the plates 27; the opposite ends of which are fastened to and bear against one of the pins 28 associated with each shoe 20 and 21 comprising the cooperating pairs thereof.

Between the supporting cylinder 25 which concentrically surrounds shaft 22 and the overlying plates 27 is mounted a drum expansion bag 31, made as a closed annular tube of rubber or the like and adapted to be inflated pneumatically or by other suitable fluid pressure. In Figure 1 it will be seen that the expansion bag 31 is collapsed between the plates 27 and the outer surface of the supporting cylinder 25 and in this condition it will be noted that the outer cylindrical surface of the forming drum 10 coincides with that of the two adjacent auxiliary drums 11 and 12. Full expansion or inflation of the bag 31 causes the several surrounding drum shoes 20 and 21 to move radially outward to the position shown in Figure 2 where the plates 27 are against their outer radial stops formed by their keyed connection with the shoulders 26 as explained above. Movement of either of the folding tubes 13 and 14 over the forming drum 10 causes inward radial movement of the shoes 20 and 21 thereof, thereby simultaneously to collapse and lengthen the forming drum 10 due to the increased pressure within the folding tubes over that within the expansion bag 31.

Associated with each cooperating pair of shoes 20 and 21, which go to make up the forming drum 10, is a means for regulating the inward radial and longitudinal sliding movement thereof. To this end I have provided each shoe with a depending stop lug 32 mounted rigidly at the outer end thereof as by welding or the like; recessed shoulders 33 being formed in the underside of the shoes to receive the upper end of the stop lugs so as to present a flush fit with the underside of the shoes when the lugs are mounted in depending relation therewith. The lower ends of the stop lugs 32 are adapted to rest on and slide along a chamfered sloping surface 34 formed on the shoulders 26 associated with shoe supporting cylinder 25. Movement of the lugs 32 downwardly along the surfaces 34 serves to slide the drum shoes 20 and 21 in a longitudinal lengthening direction at the same time permitting a decrease of the diameter of the forming drum 10. Opposite directional movement of the lugs 32 of course results in a contracting longitudinal and outward radial movement of the forming drum shoes 20 and 21.

Means for selectively limiting the inward radial movement of the lugs 32 at a series of positions along the surfaces 34 comprises a pair of annular collars 35, one mounted adjacent each end of the forming drum 10 about the axially disposed central shaft 22. Sliding connection of the collars 35 with shaft 22 is accomplished through pins 36 which are rigidly fastened to shaft 22; the projecting ends of the pins are received in helically disposed slots 37 formed in the hubs of the collars 35, as shown in partial elevation in Figure 1 of the drawings. The collars 35 are adapted for rotational movement relative to shaft 22, either by rotating the shaft 22 or by rotating the collars about shaft 22 by separate driving means, whereby the pins 36 will move along the helical slots 37 to slide the collars 35 toward and away from the stop lugs 32; the latter each having upwardly turned curved lips 38 formed thereon which attritionally contact the inner surface of the adjacent collar 35. Annular coil springs 39, 39, or like resilient means, are tensioned about the lips 38, one spring at each end of the forming drum 10. Such springs 39 simultaneously and resiliently interlock the several drum shoes 20, 21, radially inward of their exterior faces and maintain lugs 32 in contact with the sloping stop surfaces 34. Thus it may be seen that longitudinal movement of the collars 35 toward or away from the inclined surfaces 34 on the supporting cylinder shoulders 26 permits selective control of the inward radial movement of the stop lugs 32 and thus the attached shoes 20 and 21 and additionally controls the longitudinal telescopic movement of the forming drum shoes as well. As herein shown I propose to utilize four controlled radial stop positions of the shoes 20 and 21; that shown in Figure 1 wherein the forming drum is fully collapsed, that of Figure 2 wherein the drum 10 is fully expanded and the two intermediate stop positions shown in Figures 3 and 4; the latter being accomplished by controlled movement of collars 35 and stop lugs 32.

The two auxiliary drums 11 and 12 are more fully described in my referred to preceding Patent No. 2,565,071, and will not be set forth in detail herein other than to mention that each is a metal cylindrical drum adapted to support a surrounding pneumatically inflatable rubber folding bag 13 or 14 which is similar in most respects to the drum expansion bag 31, and the operation of which is again fully set forth in my Patent No. 2,565,071, of reference herein.

The cage 15 is likewise described in detail in my referred to Patent 2,565,071. Briefly the cage 15 is adapted to telescope over the drum assembly and is movable from the right hand auxiliary drum 11 to the left hand auxiliary drum 12 and back again. The cage additionally is adapted to stop in intermediate positions over the forming drum 10 to facilitate the folding operation in cooperation with the folding bags 13 and 14 as will appear presently. The cage, of course, is cylindrical in shape, surrounds the drum assembly and cooperates with the two folding bags 13 and 14 to fold two end portions 40 and 41 of the tire fabric sleeve 16 surrounding the drum assembly outside inwardly over the central portion 42 thereof.

Use and operation

In forming one type of tire carcass with the drum assembly described above, a single sheet of tire fabric is wrapped cylindrically around the drum assembly to form a sleeve 16 having the two end portions 40 and 41 thereof overlap and partially surround the two auxiliary drums 11 and 12 as shown in Figure 1. It will be understood, of course, that although the tire carcass, as demonstrated in the drawings, is limited to a single sheet of tire fabric, more than one such layer of fabric may be utilized to make up sleeve 16 depending on the number of plies desired in the finished tire carcass. Normally the tire fabric is cut on a bias whereby the cords thereof will lie in helical relation about the drum assembly. The fabric is laid about the central forming drum so that the lengthwise edges thereof meet in abutting relation to define a helically disposed joint. The mating edges of the sleeve 16 are stitched or otherwise cemented together in abutting relation which results in the formation of a substantially cylindrical sleeve member. The central forming drum is usually axially rotated to aid in laying the fabric 16 thereabout.

After the mounting of the sleeve 16, as described above, the central forming drum 10 is contracted longitudinally and expanded radially outward to its extreme outer position by virtue of the inflation of the drum expansion bag 31 under a suitable pneumatic or fluid pressure, whereby the position assumed by the central drum is substantially that as shown in Figure 2. At this stage annular bead ring assemblies 44 equipped with the usual flipper-strips 45 are mounted outwardly of the tire fabric sleeve, having been previously mounted on the drum assembly by the removal of the tail stock as mentioned previously. It should be noted that the expansion of the center drum raises a pair of shoulder portions adjacent the junctions of the central drum with the two auxiliary drums; such shoulders serving positively to locate the bead ring assemblies 44. Coinciding with the radial expansion and telescopic contraction of the center drum 10, the collar members 35 are rotated relative to shaft 22 to hold the stop lugs 32 in their upper position of travel. It should be recognized that the outward expansion of the center drum, which carries with it a central portion 42 of the tire fabric sleeve, will cause a tensioning of that portion of the tire fabric resulting in a fractional annular disturbance of the disposition of the cords in the tire fabric. It will be recognized that if the end portions 40 and 41 were successively laid over the expanded center sleeve portion 42, increased angular distortion of the tire fabric cords in the end portions would result. I, therefore, propose to lay the end portions outside inwardly over themselves and the central portion 42 at substantially the same folding diameter so as to have a minimum angular distortion of the tire fabric cords therein.

To accomplish the desired results of minimizing the angular distortion of the tire fabric cords of the folded end portions, I propose to collapse the center forming drum 10 during the folding operation of the end portions outside inwardly over the center portion 42. This will allow the end portions to be folded at substantially equal diameters with that of the center portion, as determined by the expanded position of the latter. To this end, as will be seen in Figure 3, the cage is first moved to the right so as to surround the auxiliary drum 11 and the end portion 40 of the tire fabric sleeve. The folding tube or bag 13 is then inflated and expanded, under suitable fluid pressure, radially outward to carry therewith the surounding tire fabric end portion 40 thereby to grip the fabric firmly against the inside of the folding cage. The folding cage is then moved from right to left, as viewed in Figure 3, carrying therewith the end portion 40 and folding it outside inwardly over itself, the adjacent bead ring assembly 44 and the center portion 42 of the tire fabric sleeve 16. During this operation it will be observed that the folding bag 13, being inflated with a relatively higher pressure than the expansion bag 31, causes an inward radial collapse of the expanding bag 31 so that the central forming drum moves radially inward with the stop lugs 32 coming to rest in their Figure 3 position against collars 35 and the inclined surfaces 34. Simultaneously there is a lengthwise extension of the shoes 20 and 21 to maintain the fabric tight under the bead rings 44 which aids in keeping those beads properly tied in place. At this stage the diameter of the central forming drum 10 is only slightly less than its fully expanded diameter, as shown in Figure 1, so that the right end portion 40 of the tire fabric sleeve 16 is folded outside inwardly over the central portion 42 thereof at a diameter substantially equal to the diameter of the center portion of the tire fabric sleeve 16 as it was in its expanded condition; the radial diminution of the forming drum 10 being approximately equal to a single thickness of tire fabric sleeve.

After completing the folding of the right hand end portion 40 over the central portion 42 as set forth above, the folding bag or tube 13 is collapsed by releasing the air therein which permits the tube 13 to return to its position surrounding auxiliary drum 11. Such release of the inward radial thrust on the expansion bag 31 allows that bag to reexpand the forming drum 10 to substantially its Figure 2 position causing a corresponding lengthwise contraction of the drum shoes 20 and 21. The cage 15 continues to move to the left so that it eventually comes to rest in concentric surrounding relation about the left hand folding bag 14 and auxiliary drum 12. The left hand folding bag 14 is next expanded radially outward, under suitable pneumatic pressure, carrying therewith the left hand end portion 41 of the tire fabric sleeve so as to grip that portion firmly between the folding bag and the cage, as was accomplished previously in folding the right hand end portion 40. The cage 15 then moves to the right over the central drum 10, carrying therewith the left hand end portion 41, whereby that end portion is turned outside inwardly over itself, the adjacent bead ring assembly 44, the central portion 42 of the tire fabric sleeve and the previously folded end portion 40 thereof. During this second folding operation the central drum is again radially collapsed and lengthened by virtue of the fact that pressure in the folding bag 14 is greater than the pressure within the expanding bag 31. Due to this latter inward radially movement of the central forming drum 10, the drum eventually comes to rest in its Figure 4 position which is regulated and determined by the rotation of the collars 35 relative to shaft 22 as before. It will be observed that this second stop position permits the folding of end portion 41 to be accomplished at a diameter substantialy equal to that at which the right hand end portion 40 was folded; since this second radial diminishing of the forming drum 10 is substantially equal to two thicknesses of the tire fabric sleeve 16; this second intermediate stop position still leaving the forming drum diameter slightly in excess of its fully collapsed Figure 1 diameter.

The results of the folding process as set forth above are such that the two end portions 40 and 41, after the completion of the folding thereof, have had their tire fabric cords tensioned substantially equal amounts whereby the annular disposition of the cords in the two end portions is substantially equal so that they lie in approximately parallel relation to one another. By virtue of this latter feature, the tire carcass thus made is much stronger and has the cords of the two folded portions thereof in approximate equal tension.

Following the folding operations, the pressure in the expansion bag 31 is relieved, as explained above, the cage 15 is moved back to its Figure 2 position, and the tire carcass is removed from the drum assembly after which it may be molded into a suitable tire casing in a conventional manner known to those familiar with the tire building art.

Thus it may be seen that I have shown and described a new and useful apparatus and method of folding the plies of a tire carcass, built in accordance with the teachings of my invention, wherein the folded overlapping plies have their cords lying in equal angular disposition and in parallel relation with one another so that a stronger and sturdier tire carcass construction is possible.

While I have herein shown and described a preferred embodiment of the teachings of my invention it readily will be understood that various modifications, changes and substitutions of equivalents may be made without departing from the spirit and scope thereof, and therefore, I do not wish to be restricted to the particular embodiment herein set forth except as may appear in the following appended claims.

I claim:

1. A drum assembly of the type described adapted for use with a tire building machine, comprising in combination, a plurality of radially movable cylindrical segmental shoe members combined in side-by-side relation to form a central forming drum unit, inflatable bag means disposed centrally inward of said shoes adapted for simultaneously moving said shoes radially outward to a predetermined stop position under suitable fluid pressure, inflatable folding bag means adapted to move over said forming drum and exert sufficient inward radial thrust thereon whereby said first mentioned bag and said segmental shoes will be moved radially inward and stop means for limiting inward radial movement of said shoes at a series of predetermined stop positions.

2. A drum assembly of the type described adapted for use with a tire building machine, comprising in combination, a plurality of radially and telescopically movable cylindrical segmental shoe members combined in side-by-side relation to form a central forming drum unit, inflatable bag means disposed centrally inward of said shoes adapted for simultaneously moving said shoes radially outward and telescopically inward to a predetermined stop position under suitable fluid pressure, and inflatable folding bag means adapted to move over said forming drum and exert sufficient inward radial thrust thereon whereby said first mentioned bag and said segmental shoes will be moved radially inward and said drum will be telescopically lengthened.

3. A drum assembly of the type described adapted for use with a tire building machine, comprising in combination, a plurality of radially movable shoes formed as cylindrical segments and combined in side-by-side relation to form a forming drum, inflatable bag means disposed centrally inward of said shoes for simultaneously moving said shoes radially outward to a predetermined stop position under suitable fluid pressure, inflatable folding bag means adapted to move over said forming drum and exert sufficient inward radial thrust thereon whereby said first mentioned bag and said segmental shoes will be shifted radially inward, and stop means associated with said shoes and adapted to arrest their inward radial movement in a plurality of successive predetermined positions.

4. A drum assembly of the type described adapted for use with a tire building machine, comprising in combination, a plurality of radially and telescopically movable shoes formed as cylindrical segments and combined in side-by-side relation to form a forming drum, inflatable bag means disposed centrally inward of said shoes for simultaneously moving said shoes radially outward to a predetermined stop position under suitable fluid pressure in which the length of said drum will be telescopically foreshortened, inflatable folding bag means adapted to move over said forming drum and exert sufficient inward radial thrust thereon whereby said first mentioned bag and said segmental shoes will be shifted radially inward and said forming drum will be telescopically lengthened, and stop means associated with said shoes and adapted to arrest their inward radial and longitudinally telescopic movement in a plurality of successive predetermined positions.

5. In a drum assembly of the class described for use with a tire building machine to form a tire carcass or the like, a central cylindrical forming drum, comprising a plurality of segmental shoes cylindrically arranged to form an expansible drum structure, a pair of auxiliary drums mounted in axial alignment with and one at either end of said forming drum, inflatable folding tubes surrounding each of said auxiliary drums, a cage means telescopically movable over said drum assembly whereby said inflatable tubes may be carried successively over said forming drum, and inflatable bag means within said forming drum adapted to cause said forming drum to expand radially outward, said bag means exerting a smaller outward radial thrust on said forming drum than the inward radial thrust imposed thereon by said folding tubes whereby said forming drum will collapse radially inward when either of said folding tubes is moved thereacross.

6. In a drum assembly of the class described for use with a tire building machine to form a tire carcass or the like, a central cylindrical, radially and axially expansible and contractible forming drum, a pair of auxiliary drums mounted in axial alignment with and one at either end of said forming drum, inflatable folding tubes surrounding each of said auxiliary drums, a cage means telescopically movable over said drum assembly whereby said inflatable tubes may be carried successively over said forming drum, and inflatable bag means within said forming drum adapted to cause said forming drum to expand radially outward and contractably telescope longitudinally, said bag means exerting a smaller outward radial thrust on said forming drum than the inward radial thrust imposed thereon by said folding tubes whereby said forming drum will collapse radially inward and have its length telescopically lengthened when either of said folding tubes is moved thereacross.

7. In a tire building machine, a drum assembly having a central, radially expansible and contractible forming section, auxiliary drum sections flanking either end of said forming section, flat inflatable folding tubes surrounding said auxiliary sections and adapted to be inflated and moved across said forming section, inflatable bag means within said forming section adapted radially to expand said forming section to a predetermined expanded position, and stop means for selectively limiting inward radial contraction of said forming section, said bag means being inflated at a lesser pressure than either of said tubes whereby upon movement of either of said tubes onto said forming section, inward radial collapse of said forming section occurs to a diameter designated by said stop means.

8. In a tire building machine, a drum assembly having a central, radially and longitudinally expansible forming section, auxiliary drum sections flanking either end of said forming section, flat inflatable folding tubes surrounding said auxiliary sections and adapted to be inflated and moved across said forming section, inflatable bag means within said forming section adapted radially to expand said forming section to a predetermined expanded position simultaneously causing said forming section's length to contract, said bag means being inflated at a lesser pressure than either of said tubes whereby upon movement of either of said tubes onto said forming section, inward radial collapse and longitudinal lengthening of said forming section occurs.

9. In a tire building machine, a drum assembly having a central, radially expansible, forming section, auxiliary drum sections flanking either end of said forming section, flat inflatable folding tubes surrounding said auxiliary sections adapted to be inflated and moved across said forming section, inflatable bag means mounted centrally within said forming section and adapted radially to expand said forming section to a predetermined expanded position, said bag means being inflated at a lesser pressure then either of said tubes whereby upon movement of either of said tubes onto said forming section inward radial collapse of said forming section occurs, and stop means within said forming section and operatively associated therewith, whereby said forming section is adapted to be arrested in successive radially collapsed positions in response to inward radial thrust imposed by either of said tubes.

10. In a tire building machine, a drum assembly having a central, radially expansible and longitudinally expansible and contractible, forming section, auxiliary drum sections flanking either end of said forming section, flat inflatable folding tubes surrounding said auxiliary sections adapted to be inflated and moved across said forming section, inflatable bag means mounted centrally within said forming section and adapted radially to expand said forming section to a predetermined expanded position wherein its length is foreshortened, said bag means being inflated at a lesser pressure than either of said tubes whereby upon movement of either of said tubes onto said forming section inward radial collapse and longitudinal lengthening of said forming section occurs, and stop means within said forming section and operatively associated therewith, whereby said forming section is adapted to be arrested in successive radially collapsed and longitudinally foreshortened positions in response to inward radial thrust imposed by either of said tubes.

11. A drum assembly of the class described for forming tire carcasses in conjunction with a tire building machine, comprising in combination, a central radially expansible forming drum, a pair of auxiliary drums, one flanking either end of said forming drum; expansible, inflatable folding tubes surrounding each of said auxiliary drums, said folding tubes being adapted for movement over said forming drum, an inner inflatable expansion bag within said forming drum for expanding said forming drum radially outward, said drum assembly being adapted to receive sheet tire fabric thereabout in the form of an enclosed sleeve so that end portions of said sleeve overlap each of said folding tubes whereby upon inflation of said folding tubes, and movement thereof over said radially expanded forming drum, thereby to fold said end portions outside inwardly over said forming drum, said expanded forming drum will collapse under the inward radial thrust exerted by either of said folding tubes thereon; stop means for arresting said inward radial movement of said forming drum in two successive positions so that said sleeve end portions may be folded over the center portion of said sleeve at substantially equal diameters because of which feature there is a minimum angular distortion of the tire fabric cords in said end portions whereby said cords lie in substantially parallel relation in said tire carcass.

12. A drum assembly of the class described for forming tire carcasses in conjunction with a tire building machine, comprising in combination, a central radially expansible and longitudinally expansible and contractible forming drum, a pair of auxiliary drums, one flanking either end of said forming drum; expansible, inflatable folding tubes surrounding each of said auxiliary drums, said forming tubes being adapted for movement over said forming drum, an inner inflatable expansion bag within said forming drum for expanding said forming drum radially outward and causing a simultaneous contraction of said forming drum's length, said drum assembly being adapted to receive sheet tire fabric thereabout in the form of an enclosed sleeve so that end portions of said sleeve overlap each of said folding tubes whereby upon inflation of said folding tubes and movement thereof over said radially expanded forming drum, thereby to fold said end portions outside inwardly over said forming drum, said expanded forming drum will collapse under the inward radial thrust exerted by either of said folding tubes thereon, and said drum assembly will telescope longitudinally increasing its length thereby tightly to tension said fabric about said forming drum; and stop means for arresting said inward radial and telescopic longitudinal movement of said forming drum in two successive positions so that said sleeve end portions may be folded over the center portion of said sleeve at substantially equal diameters because of which feature there is a minimum angular distortion of the tire fabric cords in said end portions whereby said cords lie in substantially parallel relation in said tire carcass.

13. In a tire building machine drum assembly of the class described, a radially expansible and contractible central forming drum, auxiliary drums in axial alignment with and flanking either end of said forming drum, a flat inflatable folding tube surrounding each of said auxiliary drums, the outer cylindrical surface of said tubes coinciding with the outer surface of said forming drum when it is in its completely radially retracted condition, inflatable bag means within said forming drum for radially expanding said forming drum to a predetermined outer expanded position under outwardly exerted radial thrust, and internal stop means associated with said forming drum for arresting the inward radial contraction of said drum at successive predetermined positions, said inward radial contraction being responsive to inward radial thrust exerted on the outer surface of said forming drum by each of said folding tubes in turn, as they are moved across said forming drum in an inflated condition.

14. In a tire building machine drum assembly of the class described, a radially and longitudinally expansible and contractible central forming drum, auxiliary drums in axial alignment with and flanking either end of said forming drum, a flat inflatable folding tube surrounding each of said auxiliary drums, the outer cylindrical surface of said tubes coinciding with the outer surface of said forming drum when it is in its completely radially retracted condition, inflatable bag means within said forming drum for radially expanding said forming drum to a predetermined outer expanded position under outwardly exerted radial thrust, said outward radial expansion of said forming drum being accompanied by a longitudinal foreshortening contraction thereof, and internal stop means associated with said forming drum for arresting the inward radial contraction and longitudinal lengthening of said drum at successive predetermined positions, said inward radial contraction and longitudinal lengthening being responsive to inward radial thrust exerted on the outer surface of said forming drum by each of said folding tubes in turn, as they are moved across said forming drum in an inflated condition.

15. In a tire building machine drum assembly of the class described, a radially expansible and contractible central forming drum, auxiliary drums in axial alignment with and flanking either end of said forming drum, a flat inflatable folding tube surrounding each of said auxiliary drums, the outer cylindrical surface of said tubes coinciding with the outer surface of said forming drum when in its smallest radially retracted condition; fluid inflatable bag means, within said forming drum, for radially expanding said forming drum to a predetermined outer expanded position under outwardly exerted radial thrust, internal stop means associated with said forming drum for arresting the inward radial contraction of said drum at successive predetermined positions, said inward radial contraction being responsive to inward radial thrust imposed on said forming drum by each of said folding tubes in turn as they are moved across said forming drum in an inflated condition; the fluid pressure within said tubes being always greater than the pressure within said bag means mounted within said forming drum.

16. In a tire building machine drum assembly of the class described, a radially and longitudinally expansible and contractible central forming drum, auxiliary drums in axial alignment with and flanking either end of said forming drum, a flat inflatable folding tube surrounding each of said auxiliary drums, the outer cylindrical surface of said tubes coinciding with the outer surface of said forming drum when in its smallest radially retracted condition; fluid inflatable bag means, within said forming drum, for radially expanding said forming drum to a predetermined outer expanded position under outwardly exerted radial thrust, said outward radial expansive movement being accompanied by a predetermined longitudinal contraction of said forming drum, internal stop means associated with said forming drum for arresting the inward radial contraction and longitudinal lengthening of said drum at successive predetermined positions, said inward radial contraction and longitudinal lengthening being responsive to inward radial thrust imposed on said forming drum by each of said folding tubes in turn as they are moved across said forming drum in an inflated condition; the fluid pressure within said tubes being always greater than the pressure within said bag means mounted within said forming drum.

17. The process of forming a multiple ply tire carcass from sheet tire fabric wherein the cords of overlapping plies thereof lie in substantially parallel relation and under substantially equivalent tension, comprising the successive steps of, forming said sheet fabric into a substantially cylindrical sleeve, radially expanding a central portion of said sleeve outwardly to form a pair of offset, annular, parallel, spaced shoulders therein, mounting annular bead ring assemblies about said sleeve and against said shoulders, overlaying one end portion of said sleeve, which extends axially outward from one of said bead ring assemblies, outside inwardly over itself, said one bead ring assembly, and said expanded central portion, and simultaneously radially contracting and axially extending said central portion a distance to permit the overlaying of said one end portion at a diameter substantially equivalent to that which said central portion was initially expanded to, overlaying a second end portion of said sleeve which extends axially outward of the other of said bead rings, outside inwardly over itself, said other bead ring assembly, said one overlaid end portion and said expanded central portion, and simultaneously radially contracting and axially extending said central portion and said one end portion radially inward a distance to permit the overlaying of said second end portion at substantially the same diameter at which said one end portion was overlaid.

18. A drum assembly for use in a tire building machine, comprising, a plurality of radially and telescopically movable shoe members, said shoe members each formed with a segmental cylindrical outer surface, means interconnecting said shoe members in longitudinal side-by-side relation to form a cylindrical forming drum, inflatable bag means disposed annularly inward of said shoe members, and means for inflating said bag means to said shoes simultaneously radially outward and telescopically inward thereby to expand the diameter and foreshorten the length of said drum formed thereof.

19. A forming drum for use in a tire building machine of the class described, comprising, a plurality of elongated shoe members having segmental cylindrical outer surfaces, means for mounting said shoe members in interlocking side-by-side relation to form a cylindrical drum; said means permitting said shoe members to move radially and axially; inflatable bag means disposed annularly inward of said shoe members, means for inflating said bag means simultaneously to move said shoe members radially outward and axially toward one another to a predetermined limit position, and stop means mounted radially inward of said shoes and engageable therewith, said stop means being so constructed and arranged as to regulate the inward radial contraction and axial extensible movement of said shoes at a plurality of preselected positions.

20. A drum assembly for use in a tire building machine, comprising, a plurality of shoe members mounted concentrically about an axis for bodily movement radially of said axis, said shoe members forming a substantially cylindrical drum surface on which a tire carcass is to be built, and being constructed to be longitudinally extensible, actuating means for bodily moving said shoes radially outward and inward, and means for extending and contracting said shoe members, said first and second means being associated in such a manner that as the shoe members are moved radially outward by said first means they are also lengthwise contracted by said second means and as they move radially inward by said first means they are lengthwise by said second means extended.

References Cited in the file of this patent

UNITED STATES PATENTS

| | | |
|---|---|---|
| 2,145,806 | Schnedarek | Jan. 31, 1939 |
| 2,182,176 | Maranville | Dec. 5, 1939 |
| 2,440,662 | Frazier | Apr. 27, 1948 |
| 2,565,071 | Frazier | Aug. 21, 1951 |
| 2,567,064 | Frazier | Sept. 4, 1951 |
| 2,614,951 | Iredell | Oct. 21, 1952 |
| 2,653,645 | Frazier | Sept. 29, 1953 |